Sept. 5, 1967 C. K. STEVENSON 3,340,037
GLASS BENDING FURNACE WITH BURNER BLAST GUIDE TUBES
Filed Oct. 21, 1963 2 Sheets-Sheet 1

INVENTOR.
CHARLES K. STEVENSON
BY
Owen + Owen
ATTORNEYS

Sept. 5, 1967  C. K. STEVENSON  3,340,037
GLASS BENDING FURNACE WITH BURNER BLAST GUIDE TUBES
Filed Oct. 21, 1963  2 Sheets-Sheet 2
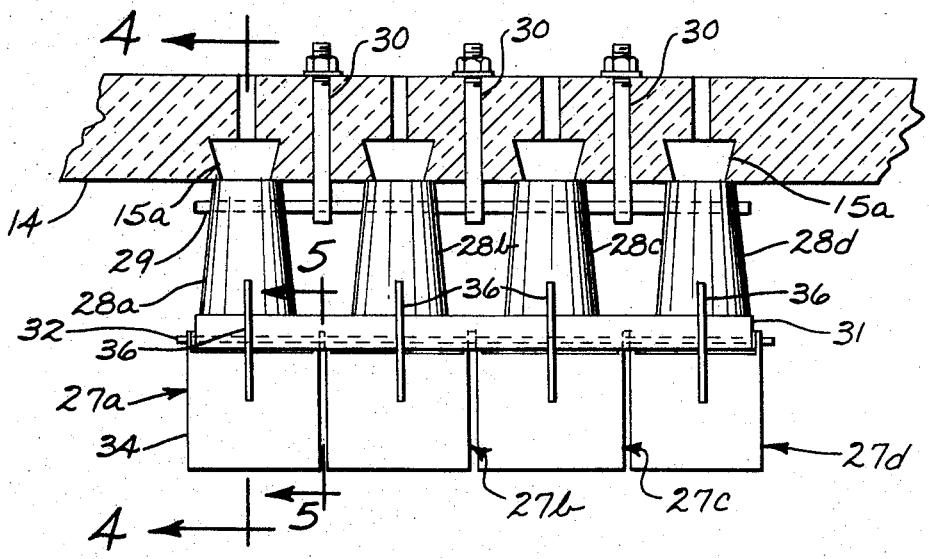
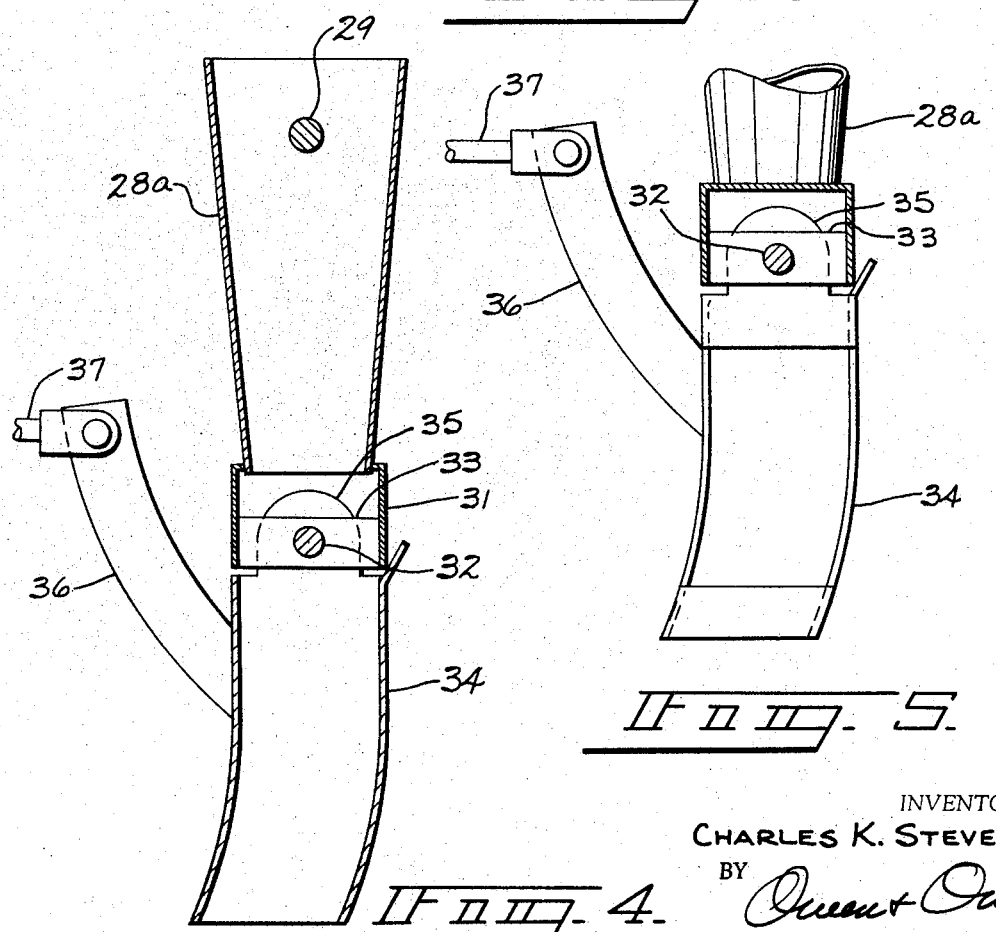
INVENTOR.
CHARLES K. STEVENSON
BY Owen + Owen
ATTORNEYS – # United States Patent Office 3,340,037
Patented Sept. 5, 1967

3,340,037
GLASS BENDING FURNACE WITH BURNER BLAST GUIDE TUBES
Charles K. Stevenson, Oregon, Ohio, assignor to Permaglass, Inc., Woodville, Ohio, a corporation of Ohio
Filed Oct. 21, 1963, Ser. No. 317,630
7 Claims. (Cl. 65—287)

This invention relates to a glass bending furnace and more particularly to apparatus for the conrtol of the direction and position of the application of concentrated heat to selected surfaces of a piece of glass which is to be sharply bent along lines extending at least generally transversely of its length.

Many large pieces of glass such as automobile and boat windshields, backlights for automobiles, windshields for aircraft, etc. are rather sharply bent in order to conform them to the overall contour of the vehicle and in order to eliminate sharp corners and corner posts which might obstruct the vision of an operator of the vehicle. Such large pieces of glass are usually bent to a desired shape by being placed upon a mold, often a skeleton mold, having a periphery corresponding to the desired periphery of the piece of glass and having a center body and wings which are so designed that they can be bent or folded to positions to give to the sheet of glass the desired three dimensional contour. Molds of this kind usually are either "drop-center" type or "stationary center" type. In the former the main center portion of the mold drops, the outer ends of the wings being held and the entire mold collapsing downwardly as the glass softens and bends. In the "stationary center" type, the center portion of the mold is mounted on a fixed carrier and the wings of the mold are swung upwardly as the sheet of glass softens and bends.

Molds of this type are often moved through continuous furnaces, each mold, for example, being mounted upon a car or an element of a conveyor with the temperature along the furnace being gradually increased to heat the glass to softening temperature and the force of gravity being relied upon to collapse the drop-center mold or to swing the wings upwardly by means of weights suitably placed to create the moment on the pivot points for the wings. In other instances, molds or mold cars for the bending of pieces of glass of this type may be passed through furnaces having separate stations or heating zones, for example the first zone being a preheat zone during which the body of the sheet of glass is raised to close to the bending temperature, the second zone being a bending zone in which the glass achieves a sufficient temperature so as to soften and conform to the mold contours and the third stage being, for example, a cooling stage or, a tempering stage if it is desired that the bent piece of glass be tempered.

Usually such pieces of glass are sharply bent along at least generally parallel, spaced lines which demark the wings of the piece of glass from its center portion and correspond to the hinge lines between the center portions and wings of the mold. Whether the particular furnace operates on a continuous intermittent basis, the piece of glass on the mold usually is oriented in the furnace in such fashion that the sharp bend lines extend generally parallel to the direction of movement of the mold through the furnace.

Because of the sharp bends, such a piece of glass must be differentially heated in order that the remaining portions of the glass do not become overheated and sag out of shape by the time the sharp bends are made.

Various suggestions have been made in the past as to ways in which certain areas of the sheets of glass can either be partly shielded from the heat from burners in the roof of such a furnace, or subjected to higher heat in order that the sections of the glass piece at the sharper bends can be more quickly heated to facilitate their being bent along the desired bending lines. It has been suggested that individual shields be mounted upon each mold to travel with the mold and its piece of glass to shield areas where sharp bending is not desired and where it is desired that the glass reach bending temperatures more slowly, but, of course, such arrangements require that each mold be supplied with a specific shield and these arrangements do not allow for easy or rapid change of the particular heat pattern applied to the glass.

It is the principal object of the present invention to provide a glass bending furnace equipped with apparatus for specifically directing higher heat to those portions of a sheet of glass which are to be more sharply bent and in which the higher heat can be directed along lines of bending which are not parallel to the direction of movement of the glass in and out of the furnace but extend at substantial angles thereto.

It is yet another object of the instant invention to provide a burner blast guide mechanism by which the blast from burners in the roof of a furnace may be directed to specific areas of a sheet of glass where it is desired that the sheet of glass be heated to a higher temperature or be heated more quickly to bending temperature.

Other and more specific objects and advantages of a glass bending furnace embodying the invention will be better understood from the specification which follows and from the drawings in which:

FIG. 3 is a fragmentary view partly in section and on an enlarged scale, taken generally from the position indicated by the line 3—3 of FIG. 1.

FIG. 4 is a further enlarged, fragmentary, vertical, sectional view taken along the line 4—4 of FIG. 3 and FIG. 5 is a fragmentary view similar, in part, to FIG. 4 but taken along the line 5—5 of FIG. 3.

Figure 1:
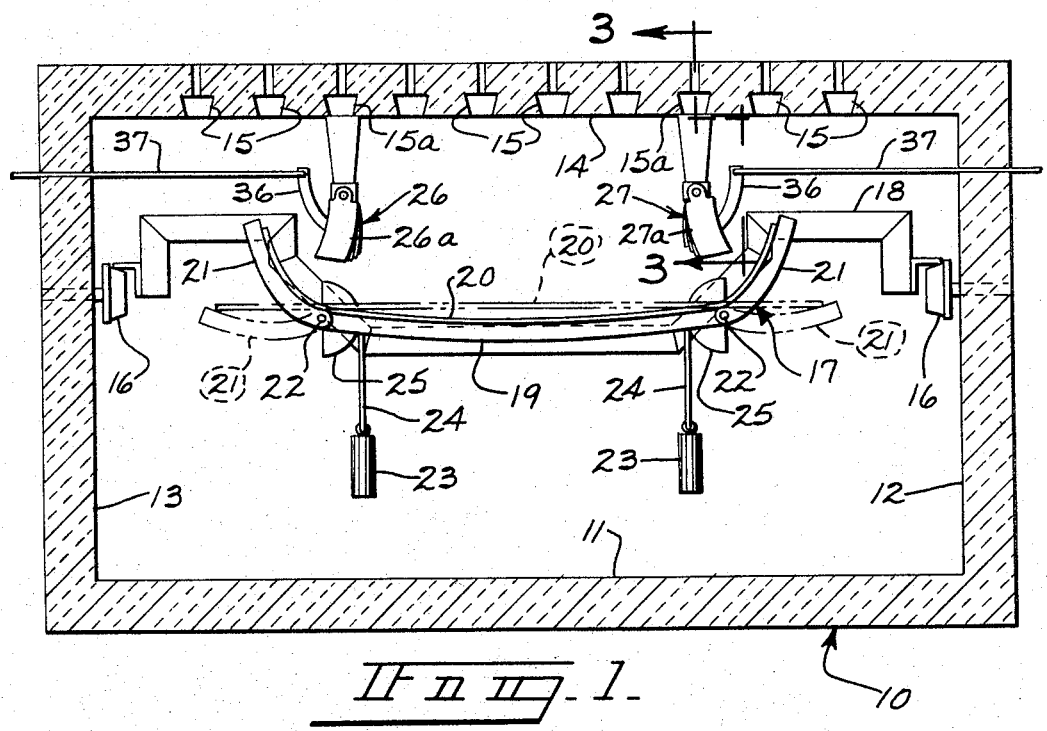
FIG. 1 is a transverse vertical sectional view across a furnace embodying the invention and showing a glass bending mold in position beneath a plurality of burner blast guide tubes constructed and arranged according to the invention, the position and relative parts of the glass bending mold and the sheet of glass itself prior to bending being shown in dotted lines.

A furnace 10 is diagrammatically illustrated in FIG. 1 and comprises, in this instance, a floor 11, parallel sidewalls 12 and 13 and a roof 14. The roof 14 of the furnace 10 is provided with a plurality of rows of burners 15 and 15a, also indicated in dotted lines in FIG. 2.

In the particular furnace illustrated in the drawings a series of rollers 16 is mounted at each of the sidewalls 12 and 13 in order to carry individual mold carts 17 into and out of the furnace zones. Each of the mold carts 17 comprises a frame 18 which supports a main or center section 19 of a mold upon which a glass sheet 20 is to be bent. The center section 19 pivotally mounts a pair of curved wing sections 21, in the mold shown in the drawings, the wing sections 21 being pivoted to the center section 19 by pivot pins 22. While a mold having a center section 19 and two wings 21 is shown in the drawings, it will be appreciated that different designs such as a mold with a single wing or with a two-part center section may also be used in a furnace according to the invention.

When the sheet of glass 20 is flat, as indicated by the dotted lines in FIG. 1 the two wing sections 21 are swung to their downward or spread position and the sheet of glass rides on the ends of the wings 21 and edges of the center section 19. As the cart 17 moves into the hotter section of the furnace or after it has been in a hot section of the furnace long enough for the glass sheet 20 to soften, gravity or other means acts to swing the wing sections 21 to their upper position bending the glass sheet 20 as they move upwardly until it finally reaches the shape illustrated in FIG. 1.

In the drawings, counterweights 23 are shown as being suspended by cables 24 stretched over sectors 25 connected to the wings 21 so that as the glass sheet 20 softens the counterweights 23 urge the wings 21 upwardly bending the glass sheet 20 to the form shown.

Figure 2:
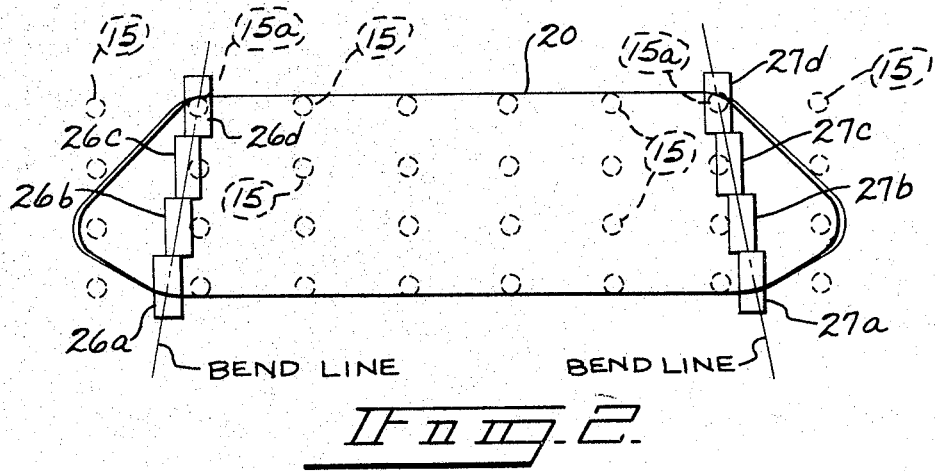
FIG. 2 is a diagrammatic plan view of a sheet of glass after bending illustrating how heat from a group of burners is selectively applied to portions of the surface of a glass sheet in order to facilitate its bending along selected bend lines.

In order to more rapidly soften those areas of the glass sheet 20 where the sharper bends are to occur it is desirable to increase the rate of heat application to these portions or to actually raise these portions to a higher temperature in order that the sharp bends will take place along the desired lines giving the finished sheet of glass 20 the particular contour intended. When the sharp bend lines extend across the sheet of glass directly parallel to the line of movement of the glass into and out of the furnace chamber, the problem of direction of excess heat to the bend line is simpler. However, when a sheet of glass such as the sheet 20 illustrated in FIG. 2 is to be bent along sharp bend lines such as those indicated in FIG. 2 which do not extend parallel to the path of movement of the mold, the problem is somewhat more complex.

In apparatus embodying the instant invention the application of higher heat along the bend lines is achieved by the employment of adjustable burner blast guides 26 and 27 which are arranged in series, in the illustrated embodiment there being four individual guides 26a, b, c, and d and 27a, b, c, and d. Each of the individual burners 15a is provided with an individual burner blast guide the guides 27a, b, c, and d being illustrated in FIGS. 3, 4 and 5, and being identical, except for their opposed direction of curvature, with the burner blast guides 26a, b, c, and d.

Each burner blast guide assembly 26 or 27 comprises a downwardly extending tube 28, a, b, c, or d, as the case might be. Each of the tubes 28 is of circular cross section near its top where it is positioned against the roof 14 so that it surrounds the opening in its respective burner 15a and then its shape gradually changes to an elongated oval shape at its lower end. All four of the tubes 28a, b, c, and d are suspended from the roof 15a on a longitudinal support rod 29 which extends through a plurality of tie-bolts 30. At their lower ends all of the tubes 28a, b, c, and d extend into corresponding openings in the upper surface of and are welded to a longitudinally extending channel 31. A pivot rod 32 extends throughout the length of the channel 31 being secured in cross braces 33.

Each of the individual burner blast guides 27a, b, c, and d also comprises a rectangular outlet 34 which may be slightly curved, as illustrated best in FIGS. 4 and 5 to a degree desired to deflect the gas from its individual burner 15a. Each of the outlets 34 has a pair of ears 35 extending upwardly from its end walls and the ears 35 are all hung on the pivot rod 32. Each of the outlets 34 has a control arm 36 extending outwardly and upwardly and each control arm 36 is connected to an individual control rod 37 which extends horizontally across the interior of the furnace 10 and to and through its respective sidewall 12 or 13. An operator can manipulate the control rods 37 from the exterior of the furnace 10 in order to properly direct or stagger the burner blast outlets 34 according to the desired configuration on the upper surface of the sheet of glass 20.

In FIG. 2 outlines indicated by the reference numerals 26a, b, c, and d and 27a, b, c, and d illustrate how a series of the outlets 34 of the burner blast guides sets 26 and 27 are directed and staggered relative to each other in order to provide for extra heat being applied to the surface of the glass sheet 20 along the bend lines indicated in FIG. 2 which are not parallel to the line of movement of the glass sheet 20 and cart 17 through the furnace 10. If the sharp bend lines are parallel to the line of movement or if the sharp bend lines, for example, are angular thereto in a direction opposite to those shown in FIG. 2, the operator may adjust the relative positions of the individual outlets 34 of the burner blast guides 26 and 27 so as to apply the heated gaseous blast from the burners in the rows 15a to precisely those portions of the glass sheet 20 where the sharpest bends are desired to take place. By reason of the individual adjustment of each of the blast guide outlets 34 which is provided for by an apparatus constructed according to the invention the same furnace may be employed for the bending of glass sheets having different peripheral contours and different degrees of bend and along bend lines which extend at substantial angles to the direction of travel.

What I claim is:

1. In a glass bending furnace having a roof, and conveyor means for moving molds along a path into and out of said furnace, each of said molds having a center section and at least one wing section hinged thereto along a line of sharp bend extending across the sheet of glass bent thereon, at an angle to said path, the improvement comprising, a plurality of laterally spaced, generally, longitudinal rows of stationary gaseous blast burners in said furnace roof, said rows of burners being parallel to said path, said blast guide for each of said burners in a row of burners generally overlying the area of the sharp bend line of said mold, a blast output pivotally attached on the lower end for each of said guides for angular movement relative thereto, and means for individually adjusting the direction of the blast outlet for each of said burners for directing such blasts onto the surface of a glass sheet on said mold along said sharp bend line, whereby the blasts from said blast outlets may extend along sharp bend lines that are angularly oriented relative to said path of movement.

2. In a glass bending furnace having a roof, and conveyor means for moving molds along a path into and out of said furnace, each of said molds having a center section and two wing sections pivoted thereto along lines of sharp bend extending across the sheet of glass bent thereon, said bend lines extending at an angle to said path, the improvement comprising, a plurality of laterally spaced, longitudinal rows of stationary gaseous blast burners in said furnace roof, a burner blast guide for each of said burners in a row of burners overlying each of the areas of the sharp bend lines of said mold, an outwardly curved blast outlet pivotally attached on the lower end of each of said guides for angular movement relative thereto, and means for individually adjusting the direction of the blast outlet for each of said burners for directing such blasts onto the surface of a glass sheet on said mold along said sharp bend lines.

3. In a glass bending furnace of the type having a roof and conveyor means for moving molds along a path through said furnace, said molds being adapted to receive a sheet of glass and operable to produce at least one bend in the sheet of glass, the improvement comprising, a plurality of gaseous blast burners disposed along said path and each of which includes a gas burning chamber disposed in a stationary position relative to the roof of said furnace, adjustable blast guide means including at least a portion thereof pivotally attached to each of said burners for angular movement relative thereto to direct gases from each burner to various lateral predetermined areas of a sheet of glass, and including means for individually adjusting the position of each of said blast guide means.

4. In a furnace as set forth in claim 3 wherein said burners are in rows extending substantially parallel to said path.

5. In a furnace as set forth in claim 3 wherein said gas burning chambers are disposed in said roof of said furnace.

6. In a furnace as set forth in claim 3 wherein each of said blast guide means includes a downwardly extending tube suspended from the associated burner, and a guide pivotally connected to said tube.

7. In a furnace as set forth in claim 6 wherein each guide is curved along the length thereof.

References Cited

UNITED STATES PATENTS 2,893,170   7/1959   Carson et al. _____ 65—107
3,241,936   3/1966   Leflet et al. _____ 65—107 X DONALL H. SYLVESTER, *Primary Examiner.*

A. D. KELLOGG, *Assistant Examiner.*